(12) United States Patent
Sordoni et al.

(10) Patent No.: US 10,592,607 B2
(45) Date of Patent: Mar. 17, 2020

(54) ITERATIVE ALTERNATING NEURAL ATTENTION FOR MACHINE READING

(71) Applicant: Maluuba Inc., Toronto (CA)

(72) Inventors: Alessandro Sordoni, Montreal (CA);
Philip Bachman, Montreal (CA);
Adam Peter Trischler, Montreal (CA)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 121 days.

(21) Appl. No.: 15/612,956

(22) Filed: Jun. 2, 2017

(65) Prior Publication Data

US 2017/0351663 A1 Dec. 7, 2017

Related U.S. Application Data

(60) Provisional application No. 62/345,421, filed on Jun. 3, 2016.

(51) Int. Cl.
*G06F 17/27* (2006.01)
*G06N 3/04* (2006.01)
*G06N 7/00* (2006.01)

(52) U.S. Cl.
CPC ........ *G06F 17/2785* (2013.01); *G06F 17/278* (2013.01); *G06N 3/0445* (2013.01); *G06N 3/0454* (2013.01); *G06N 7/005* (2013.01)

(58) Field of Classification Search
CPC ..................................................... G06F 17/02

USPC .......................... 704/1, 9, 10, 257, 270–275
See application file for complete search history.

(56) References Cited

U.S. PATENT DOCUMENTS

| | | | | |
|---|---|---|---|---|
| 6,078,914 A | * | 6/2000 | Redfern | G06F 17/30663 |
| 6,904,428 B2 | * | 6/2005 | Frieder | G06F 17/30976 |
| 6,910,003 B1 | * | 6/2005 | Arnold | G06F 17/30616 704/1 |
| 2002/0116176 A1 | * | 8/2002 | Tsourikov | G06F 17/2785 704/9 |
| 2012/0084293 A1 | * | 4/2012 | Brown | A61B 5/00 707/741 |
| 2014/0358890 A1 | * | 12/2014 | Chen | G06F 17/30867 707/710 |

OTHER PUBLICATIONS

Bahdanau, et al., "Neural Machine Translation by Jointly Learning to Align and Translate", In Proceedings of 3rd International Conference on Learning Representations, May 19, 2016, pp. 1-15.
Cho, et al., "Learning Phrase Representations Using RNN Encoder-Decoder for Statistical Machine Translation", Retrieved from <<https://arxiv.org/pdf/1406.1078v1.pdf>>, Jun. 3, 2014, 14 Pages.

(Continued)

*Primary Examiner* — Jesse S Pullias
(74) *Attorney, Agent, or Firm* — Drinker Biddle & Reath LLP

(57) ABSTRACT

Described herein are systems and methods for providing a natural language comprehension system (NLCS) that iteratively performs an alternating search to gather information that may be used to predict the answer to the question. The NLCS first attends to a query glimpse of the question, and then finds one or more corresponding matches by attending to a text glimpse of the text.

20 Claims, 10 Drawing Sheets

(56) References Cited

OTHER PUBLICATIONS

Kadlec, et al., "Text Understanding with the Attention Sum Reader Network", Retrieved from <<https://arxiv.org/pdf/1603.01547v1.pdf>>, Mar. 4, 2016, 9 Pages.

"International Search Report and Written Opinion Issued in PCT Application No. PCT/US2017/035812", dated Sep. 25, 2017, 17 Pages.

Sukhbaatar, et al., "End-To-End Memory Networks", In Proceedings of Advances in Neural Information Processing Systems, Nov. 24, 2015, pp. 1-11.

Yin, et al., "Neural Generative Question Answering", In Proceedings of the Workshop on Human-Computer Question Answering, Apr. 22, 2016, pp. 1-12.

\* cited by examiner

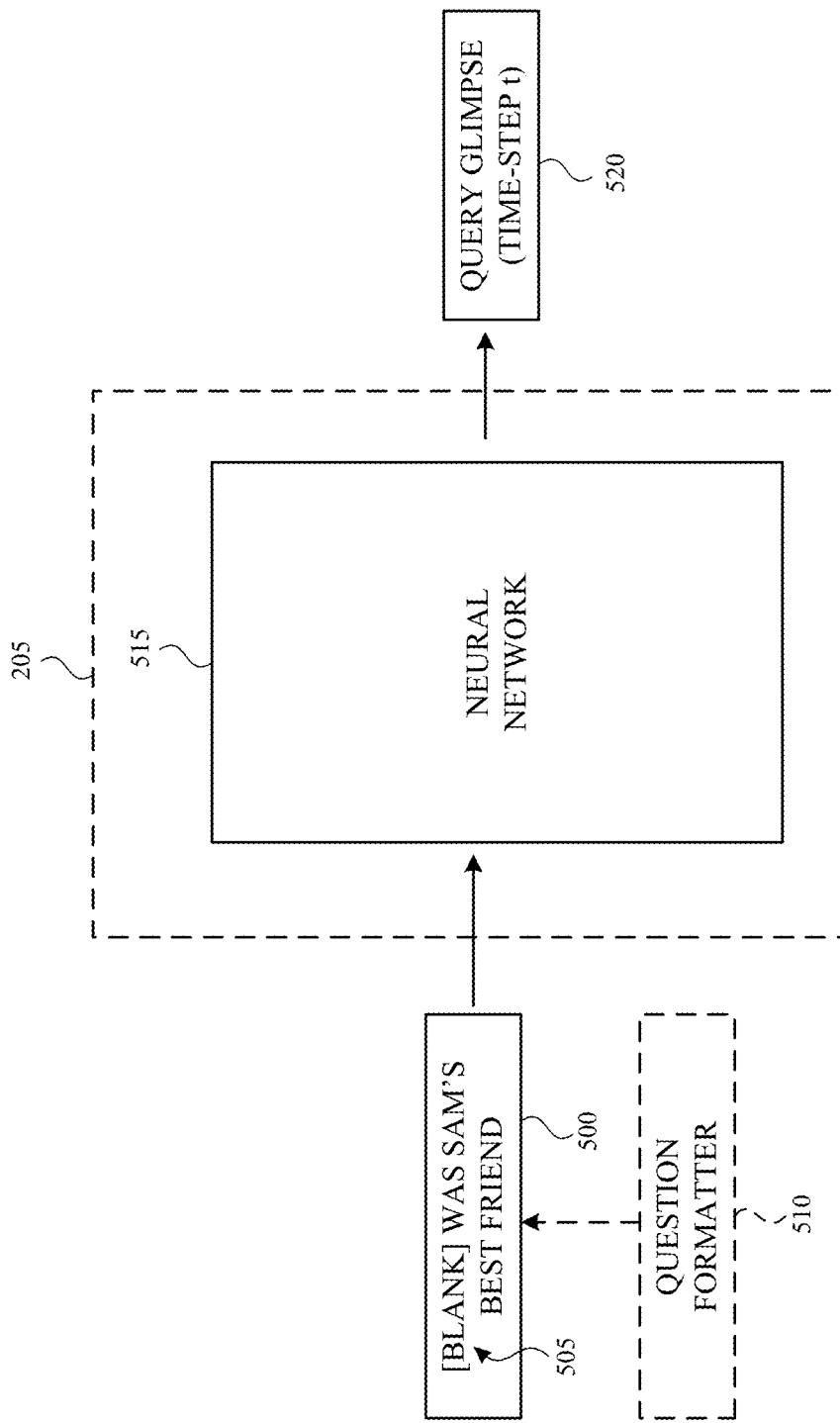

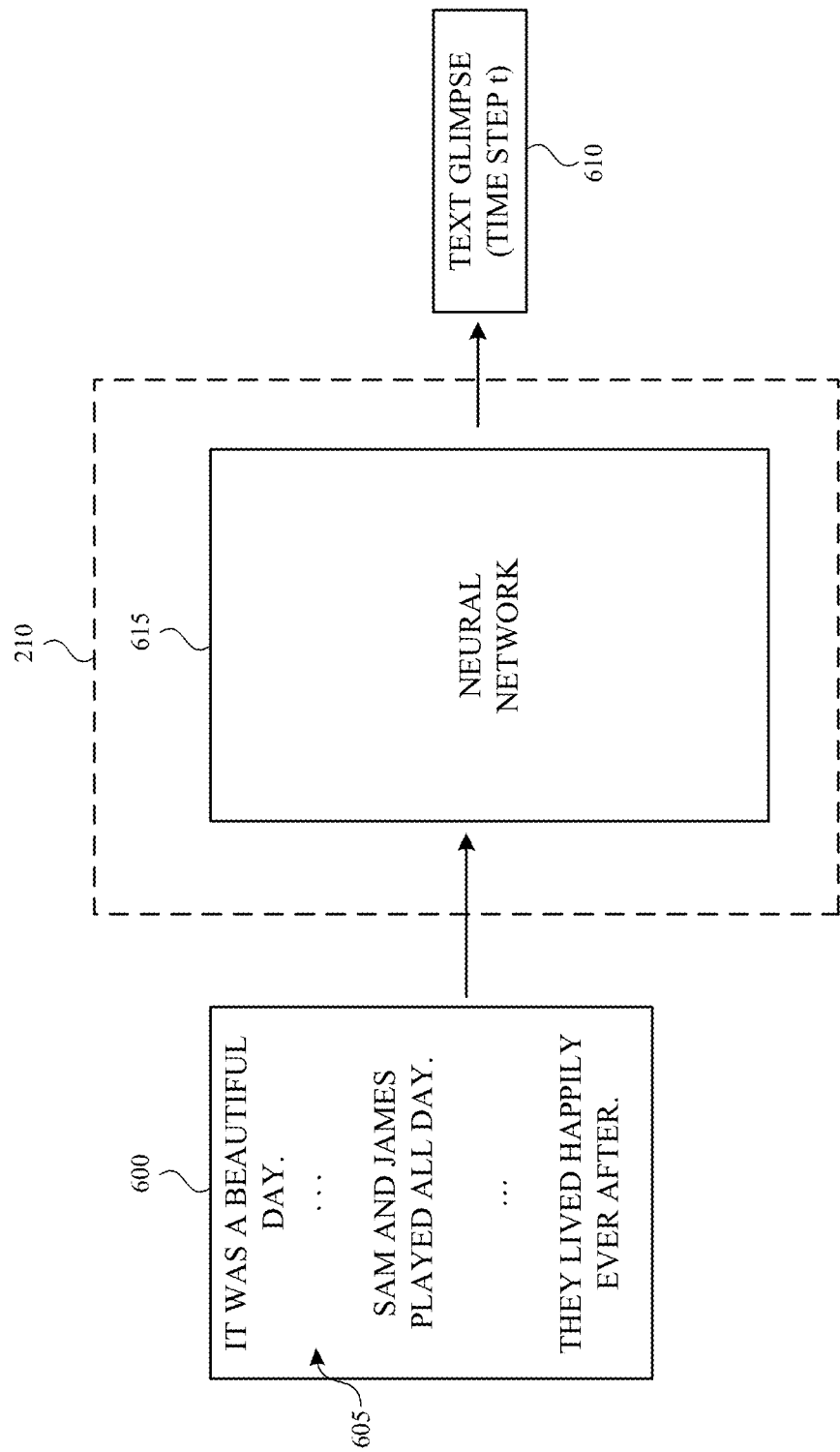

ITERATIVE ALTERNATING NEURAL ATTENTION FOR MACHINE READING

CROSS-REFERENCE TO RELATED APPLICATION(S)

This application claims priority to U.S. Provisional Application No. 62/345,421 entitled "Alternated Iterative Neural Attention For Machine Reading," filed on Jun. 3, 2016, of which the entire disclosure is hereby incorporated by reference in its entirety.

BACKGROUND

Comprehension of natural language by machines, at a near-human level, is a major goal for Artificial Intelligence. Indeed, most human knowledge is collected in the natural language of text. Machine comprehension of unstructured, real-world text has therefore garnered significant attention from scientists, engineers, and scholars. This is due, at least in part, to the fact many natural language processing tasks, such as information extraction, relation extraction, text summarization, or machine translation, depend implicitly or explicitly on a machine's ability to understand and reason with natural language.

SUMMARY

Embodiments disclosed herein provide a natural language comprehension system (NLCS) that iteratively performs an alternating search to gather information that may be used to predict an answer to a question. The NLCS first attends to a query glimpse of the question, and then finds one or more corresponding matches by attending to a text glimpse of the text. The query glimpse includes one or more entities in a portion of the question and the text glimpse includes one or more entities in a portion of the document that may be relevant to answering the question. The alternating attention mechanism permits the NLCS to reason about different query glimpses in a sequential way based on the text glimpses that were gathered previously from the text.

In one aspect, a system includes first processing circuitry and second processing circuitry operably connected to third processing circuitry. In some implementations, the first processing circuitry, the second processing circuitry, and the third processing circuitry each comprises one or more bi-directional recurrent neural networks having gated recurrent units. The system also includes one or more storage devices that store computer executable instructions that when executed by the first, the second, and the third processing circuitries, performs a method. The method includes processing, by the first processing circuitry, a question relating to a document to produce a query glimpse, and processing, by the second processing circuitry, one or more passages of text in the document to produce a text glimpse. As described earlier, the query glimpse includes one or more entities in a portion of the question and the text glimpse includes one or more entities in a portion of the document that may be relevant to answering the question. The method further includes processing, by the third processing circuitry, the query glimpse and the text glimpse to produce a result. The result can be a set of candidate answers, or the result may be information that is not useful or relevant to predicting an answer to the question. The set of candidate answers includes one or more candidate answers.

In another aspect, a method includes processing a question relating to a document to produce a query glimpse and processing one or more passages of text in the document to produce a text glimpse. The query glimpse includes one or more entities in a portion of the question and the text glimpse includes one or more entities in a portion of the document that may be relevant to answering the question. The method further includes processing the query glimpse and the text glimpse to produce a result. The result includes one of a set of candidate answers or information that is not useful or relevant to predicting an answer to the question.

In yet another aspect, a method includes processing, at a first time-step, a question relating to a document to produce a query glimpse, and processing, at the first time-step, one or more passages of text in the document to produce a text glimpse. The query glimpse includes one or more entities in a portion of the question and the text glimpse includes one or more entities in a portion of the document that may be relevant to answering the question. The method further includes processing the query glimpse and the text glimpse to produce a result and determining if the result includes a set of candidate answers. If the result includes the set of candidate answers, the set of candidate answers are stored. A determination is made as to whether all of the query and the text glimpses have been processed. If not, the method repeats the operations of processing the question relating to the document to produce an additional query glimpse, the additional query glimpse including one or more different entities in a different portion of the question; processing one or more additional passages of text in the document to produce an additional text glimpse, the additional text glimpse including one or more different entities in a different portion of the text that are relevant to answering the question; processing the additional query glimpse and the additional text glimpse to produce an additional result; determining if the additional result includes another set of candidate answers; and if the result includes the additional set of candidate answers, storing the additional set of candidate answers. When all of the query and the text glimpses have been processed, a predicted answer is determined based on each stored set of candidate answers.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures. The elements of the drawings are not necessarily to scale relative to each other. Identical reference numerals have been used, where possible, to designate identical features that are common to the figures.

FIG. 5 is process flow diagram depicting the first processing circuitry processing a question;

FIG. 6 is process flow diagram illustrating the second processing circuitry processing a document;

DETAILED DESCRIPTION

Figure 1:
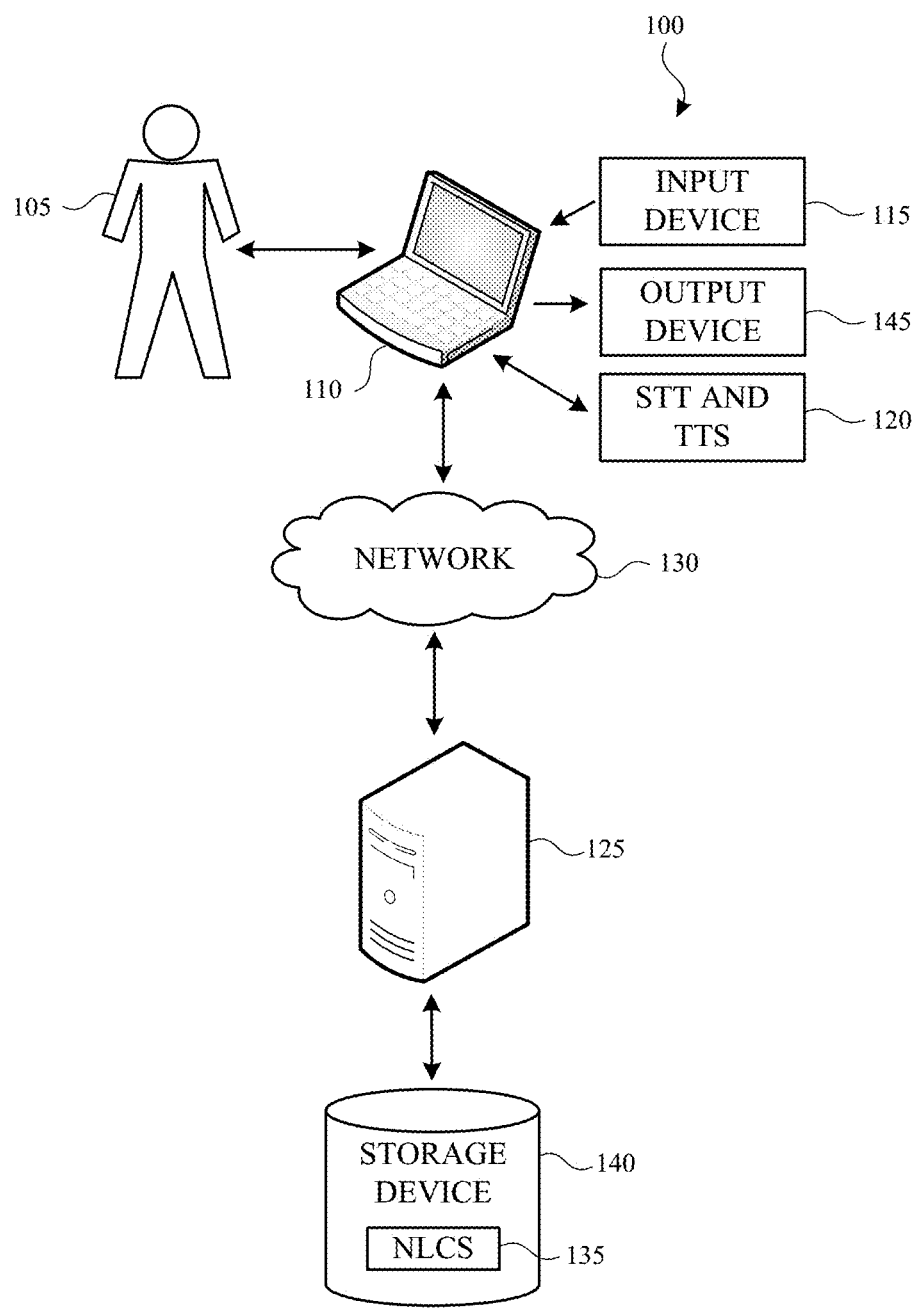
FIG. 1 illustrates an example system that can include a natural language comprehension system.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Embodiments described herein provide an attention-based natural language comprehension system (NLCS) that performs machine reading comprehension tasks. In one embodiment, the NLCS receives a Cloze-style question that relates to the text in a document. A Cloze-style question includes a sentence or a sequence of words with one or more entities removed (e.g., a blank). One example of a Cloze-style question is a "fill-in-the-blank" question. The embodiments disclosed herein are described as using a Cloze-style question having one missing entity (e.g., one blank), although embodiments are not limited to this question format or question type.

The text is typically included in a document, such as a web page, a book, a manual, a paper, or any other suitable document that includes one or more passages of text. The text includes one or more sentences, with each sentence including a sequence of words. The terms "entity" or "entities" are used herein to represent a word, a sequence of words, and/or a noun phrase in the text and in a question related to the text. One example of an entity is a named entity, which can be the name of a person or a location.

The NLCS iteratively performs an alternating search to gather information that may be used to predict the answer to the question (e.g., predict an answer to fill in the blank). In particular, at each time-step, the NLCS: (1) performs an attentive read on the question, resulting in a query glimpse $q_t$ that includes one or more entities in the question; and (2) given the current query glimpse, extracts a conditional document glimpse do that represents one or more entities in the document that nay be relevant to the current query glimpse.

Embodiments of the present disclosure provide an NLCS that alternates its attention between the question and the document to obtain a fine-grained exploration of both the question and the text. In some embodiments, the fine-grained exploration of both the question and the text occurs within a given computation time (e.g., a fixed number of time-steps). In general, the given number of time-steps contains fewer time-steps than the number of time-steps used by conventional NLCSs when processing a question and the text to predict an answer. In many instances, the NLCS produces a predicted answer in less time than a conventional NLCS.

FIG. 1 illustrates an example system that can include a natural language comprehension system. The system 100 allows a user 105 to submit a question associated with the text in a document using a client-computing device 110. The client-computing device 110 may include, or be connected to, an input device 115 that receives the question. The question can be submitted as a textual question (e.g., written) or as a spoken question that is converted to a textual question (e.g., using a speech-to-text device (STT) 120). The input device 115 may be any suitable type of input device or devices configured to receive the question. In non-limiting examples, the input device 115 may be a keyboard (actual or virtual) and/or a microphone.

The client-computing device 110 is configured to access one or more server-computing devices (represented by server-computing device 125) through one or more networks (represented by network 130) to interact with a natural language comprehension system (NLCS) 135 stored on one or more storage devices (represented by storage device 140). As will be described in more detail later, the NLCS 135 processes the question and the text in the document to predict an answer to the question. The prediction of the answer can cause the answer to be provided to the user 105 through an output device 145 that is in, or connected to, the client-computing device 110. In non-limiting examples, the output device is a display that displays the predicted answer and/or a speaker that "speaks" the predicted answer (e.g., using a text-to-speech device (TTS) 120).

In one or more embodiments, the client-computing device 110 is a personal or handheld computing device having both the input and output devices 115, 145. For example, the client-computing device 110 may be one of: a mobile telephone; a smart phone; a tablet; a phablet; a smart watch; a wearable computer; a personal computer; a desktop computer; a laptop computer; a gaming device/computer (e.g., Xbox); a television; and the like. This list of example client-computing devices is for example purposes only and should not be considered as limiting. Any suitable client-computing device that provides and/or interacts with an NLCS may be utilized.

As should be appreciated, FIG. 1 is described for purposes of illustrating the present methods and systems and is not intended to limit the disclosure to a particular sequence of steps or a particular combination of hardware or software components.

The processing performed by the NLCS includes three steps or stages. In one embodiment, the first stage is an encoding step, where a set of one or more vector representations are computed. The vector representation(s) act as a memory of the content of the question and the text. The next stage is the inference step. The inference step untangles, or aims to untangle, the complex semantic relationships linking the text and the question in order to provide sufficiently strong evidence for the answer prediction to be successful. During the inference step, an iterative process is performed that, at each iteration, alternates attentive memory accesses to the question and the text. A prediction step is the third stage. The prediction step uses the information gathered from the repeated attentions through the question and the text to increase or maximize the probability of the correct answer.

Figure 2:
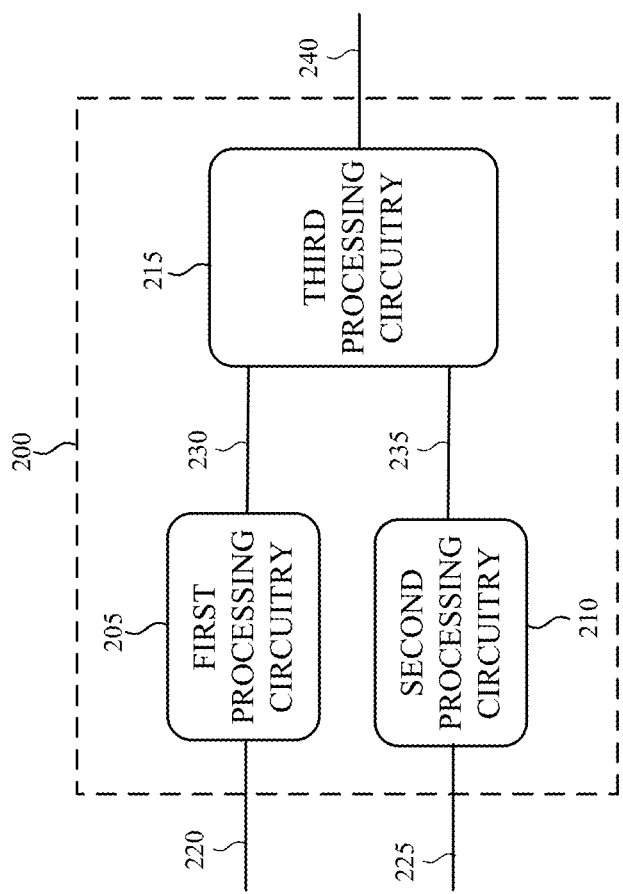
FIG. 2 is a block diagram depicting an example of a natural language comprehension system.

FIG. 2 is a block diagram depicting an example of a natural language comprehension system (NLCS). The NLCS 200 iteratively performs an alternating search to gather information that may be used to predict the answer to the question. In particular, at each time—step t, the NLCS 200: (1) performs an attentive read on the question, resulting in a query glimpse $q_t$, and (2) given the current query glimpse, extracts a conditional document glimpse $d_t$ that represents the parts (e.g., entities) of the document that are relevant to the current query glimpse. As used herein, a query glimpse refers to a portion of the question and a text glimpse refers to a portion of the text.

The NLCS 200 includes first processing circuitry 205 and second processing circuitry 210 operably connected to third processing circuitry 215. The first processing circuitry 205 receives the question on line 220. The first processing circuitry 205 processes the question to determine, at each time-step, a query glimpse $q_t$. The second processing circuitry 210 receives a document that includes one or more passages of text on line 225.

The second processing circuitry 210 processes the text to determine, at each time-step, a text glimpse that may be useful in answering the question.

The third processing circuitry 215 receives, at each time-step, a query glimpse from the first processing circuitry 205 and a text glimpse from the second processing circuitry 210. The third processing circuitry 21 processes the query and the text glimpses to determine if the text glimpse provides a set of candidate answers to the question. The set of candidate answers nay include one or more candidate answers to the question. In particular, the third processing circuitry 215 outputs a result on line 240. The result may be a set of candidate answers, or the result can be information or data that is not relevant or useful to predicting an answer to the question.

In some embodiments, the set of candidate answers also includes a probability distribution over the candidate answer(s) in the set of candidate answers. Thus, a set of candidate answers can include one or more candidate answers and a probability associated with each candidate answer that the candidate answer is the predicted answer. The first, the second, and the third processing circuitries 205, 210, 215 are discussed in more detail in conjunction with FIGS. 3-7.

As described earlier, the NLCS 200 employs an alternating attention mechanism. The NLCS 200 first attends to a query glimpse of the question, and then finds one or more corresponding matches by attending to a text glimpse of the text. The alternating attention mechanism permits the NLCS 200 to reason about different query glimpses in a sequential way based on the text glimpses that were gathered previously from the text.

The various elements shown in FIG. 2 can be implemented in any suitable device in a system (e.g., client-computing device 110, server-computing device 125, and/or storage device 140 in FIG. 1). For example, in one embodiment, the first processing circuitry 205, the second processing circuitry 210, and the third processing circuitry 215 are implemented in one or more server-computing devices (e.g., server-computing device 125). In another non-limiting example, the first processing circuitry 205 is implemented in a client-computing device (e.g., client-computing device 110) and the second and the third processing circuitries 210, 215 are implemented in one or more server-computing devices.

Figure 3:
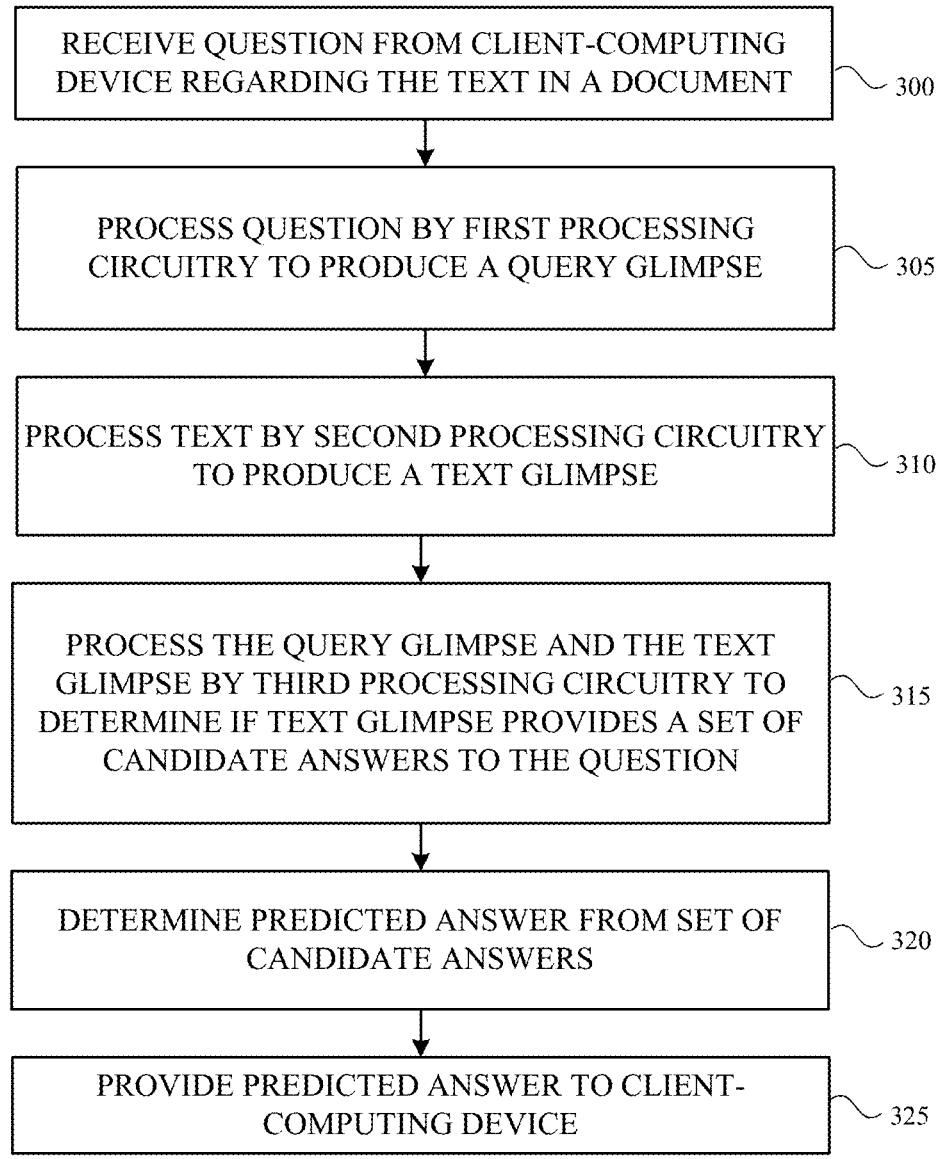
FIG. 3 is a flowchart illustrating a first method of predicting an answer to a question through natural language comprehension.

FIG. 3 is a flowchart illustrating a first method of predicting an answer to a question through natural language comprehension. Initially, a question relating to the text in a document is received from a client-computing device at block 300. In one embodiment, the question is a Cloze-style question. The question is processed by the first processing circuitry to produce a query glimpse (block 305). Next, as shown in block 310, the text in the document is processed independently by the second processing circuitry to produce a text glimpse from the text.

The query glimpse and the text glimpse are then processed by the third processing circuitry to determine if the text glimpse provides a set of candidate answers to the question (block 315). As described earlier, in one embodiment, the set of candidate answers may include one or more candidate answers and a probability associated with each candidate answer that the candidate answer is the predicted answer.

A predicted answer is then selected from the set of candidate answers (block 320). The predicted answer is provided to the client-computing device at block 325. In one embodiment, the predicted answer is presented to a user on a display included in, or connected to, the client-computing device. Other embodiments can present the predicted answer to the user using different types of output techniques and/or output devices.

Figure 4A:
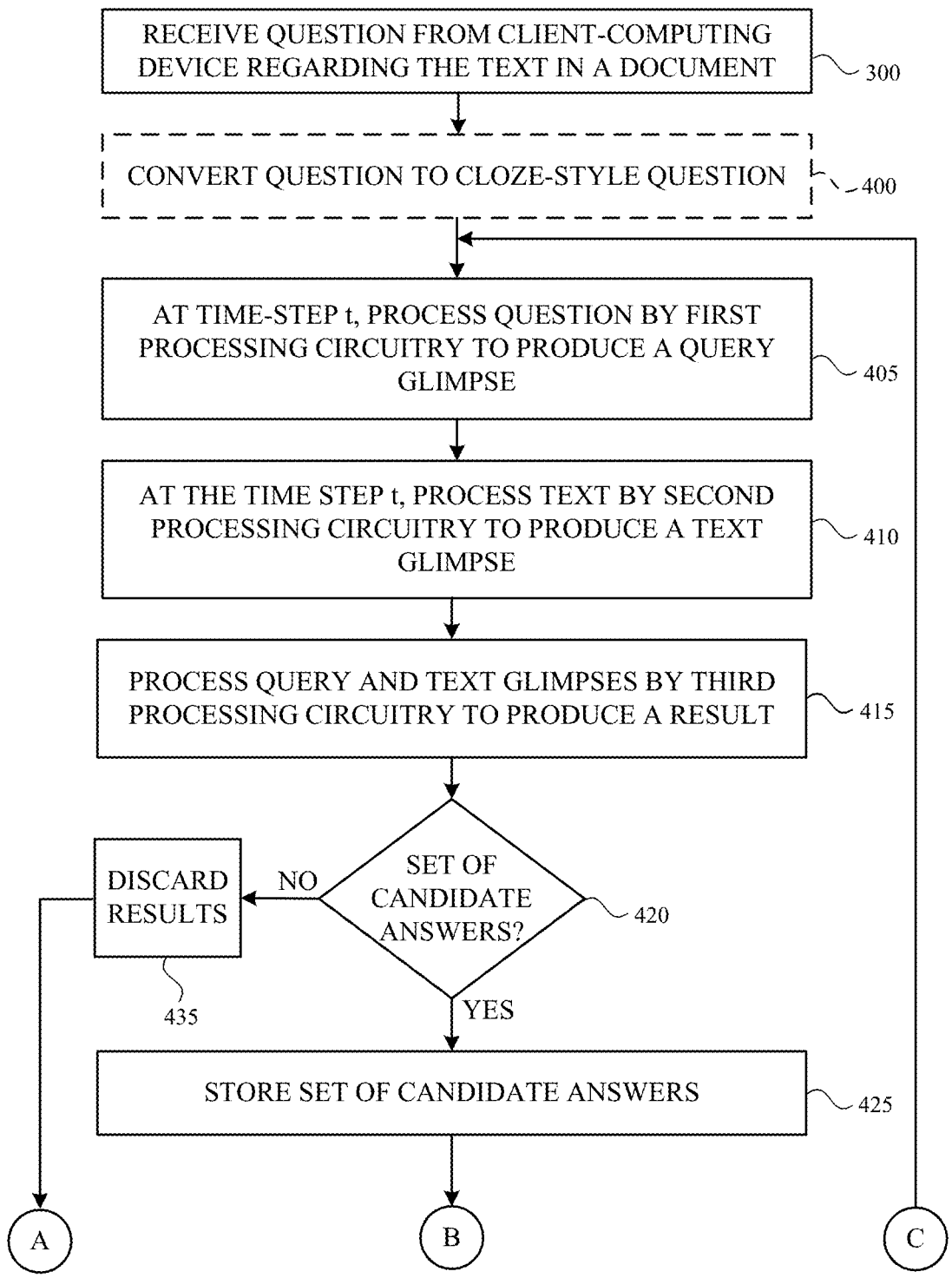
FIGS. 4A-4B depict a flowchart illustrating a second method of predicting an answer to a question through natural language comprehension.
Figure 4B:
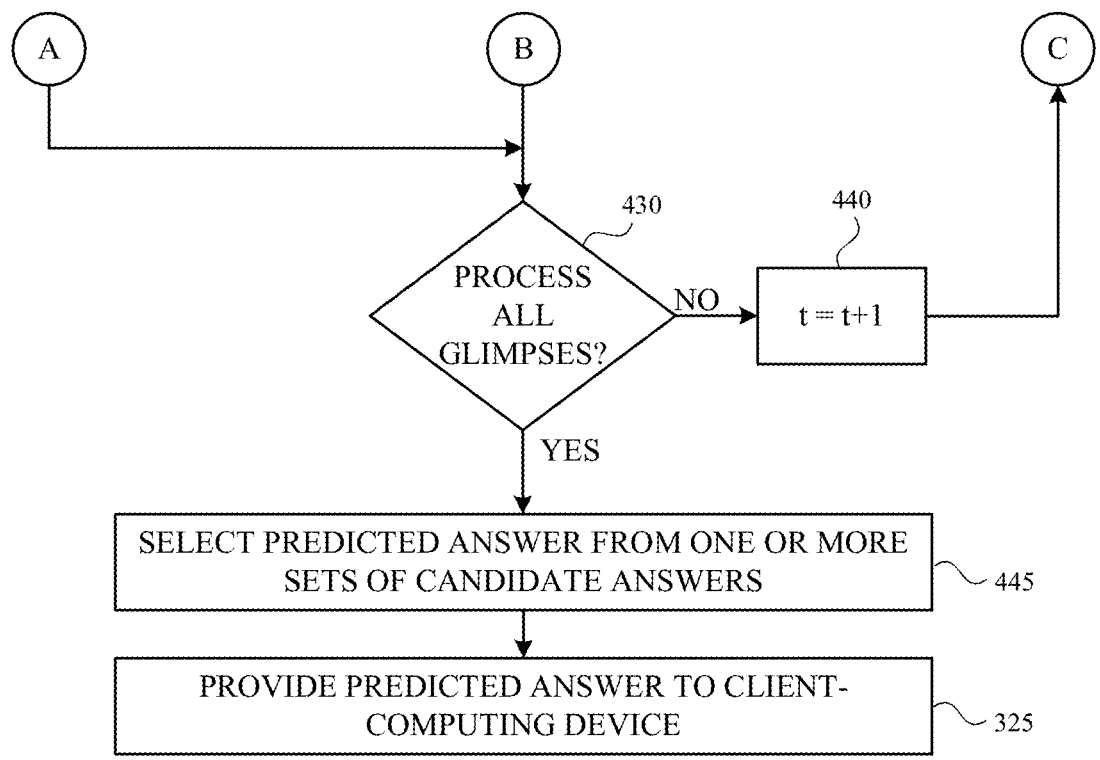

FIGS. 4A-4B depict a flowchart illustrating a second method of predicting an answer to a question through natural language comprehension. For completeness, the representative flowchart includes blocks 300 and 325 from FIG. 3. For the sake of brevity, the description of blocks 300 and 325 are not repeated in full in the description of FIGS. 4A-4B.

Initially, a question relating to the text in a document is received from a client-computing device (block 300). As described earlier, the question can be a Cloze-style question that includes a sentence or sequence of words with one or more entities removed (e.g., a blank). However, in some instances, the question is not drafted or formatted as a Cloze-style question when it is received. Accordingly, in such situations, the question is converted (e.g., formatted or re-written) to a Cloze-style question at block 400. Block 400 is optional and is not performed when the question is presented as a Cloze-style question.

Next, as shown in block 405, the first processing circuitry processes the question at a time-step t to determine a query glimpse $q_t$. Given the current query glimpse, the second processing circuitry processes the text at the time-step t to determine a text glimpse $d_t$ (block 410). The text glimpse includes one or more entities in a portion of the text that may be relevant to determining or predicting an answer to the question.

The query glimpse and the text glimpse are then processed by the third processing circuitry and a determination is made as to whether the results produced by the processing of the query and text glimpses results in a set of candidate answers (blocks 415, 420). If the result is a set of candidate answers, the process passes to block 425 where the set of candidate answers is stored in a storage device (e.g., storage device 140 in FIG. 1). The method then continues at block 430 where a determination is made as to whether all of the query and the text glimpses have been processed by the third processing circuitry. Returning to block 420, if a set of candidate answers is not produced at block 415 (e.g., result is information or data that is not relevant or useful to predicting an answer), the result is discarded at block 435 and the process passes to block 430.

If the determination made at block 430 is that all of the query and the text glimpses have not been processed by the third processing circuitry, the method continues at block 440 where the NLCS moves onto the next time-step (represented by incrementing time-step t by one) and the process returns to block 405. The method repeats until all of the query and the text glimpses have been processed.

If the determination made at block 430 is that all of the query and the text glimpses have been processed by the third processing circuitry, the process passes to block 445 where a predicted answer is determined from the one or more sets of candidate answers stored at block 425. As described earlier, each set of candidate answers can include one or more candidate answers and a probability associated with each candidate answer that the candidate answer is the predicted answer. In such embodiments, the predicted answer is determined based on the probability associated with each candidate answer (e.g., the candidate answer with the highest probability is selected as the predicted answer).

Next, as shown in block 325, the predicted answer is provided to the client-computing device. In one embodiment, the predicted answer is transmitted to the client-computing device over one or more networks (e.g., network 130 in FIG. 1).

FIG. 5 is process flow diagram depicting the first processing circuitry processing a question. In the illustrated embodiment, the question 500 is a Cloze-style question that is missing an entity (e.g., has a blank 505). As described earlier, in some instances, the question is not initially drafted or formatted as a Cloze-style question. Accordingly, in such situations, a question formatter 510 converts (e.g., formats or re-writes) the question into a Cloze-style question. The question formatter 510 is optional and is not utilized when the question is presented as a Cloze-style question.

The question 500 is a sequence of words $X=(x_1, \ldots, x_{|X|})$ drawn from a vocabulary V. In one embodiment, each word can be represented by a continuous word embedding $x \in \mathbb{R}^d$ that is stored in a word embedding matrix $X \in \mathbb{R}^{|V| \times d}$. The sequence X is received and processed by the first processing circuitry 205. In one aspect, the first processing circuitry 205 includes one or more neural networks (represented by neural network 515). One example of a neural network is a bi-directional recurrent neural network having gated recurrent units (GRUs). For each position i in the sequence X, the GRU receives as input the word embedding $x_i$ and updates a hidden state $h_{i-1}$ to $h_i = f(x_i, h_{i-1})$, where f is defined by the following equations:

$$r_i = \sigma(I_r x_i + H_r h_{i-1}), \quad \text{Equation 1}$$

$$u_i = \sigma(I_u x_i + H_u h_{i-1}), \quad \text{Equation 2}$$

$$\overline{h}_i = \tan h(I_h x_i + H_h(r_i \cdot h_{i-1})), \quad \text{Equation 3}$$

$$h_i = (1 - u_i) \cdot h_{i-1} + u_i \overline{h}_i, \quad \text{Equation 4}$$

where $h_i$, $r_i$, and $u_i \in \mathbb{R}^h$ are the recurrent state, the reset gate and the update gate, respectively, $I_{\{r,u,h\}} \in \mathbb{R}^{h \times d}$ and $H_{\{r,u,h\}} \in \mathbb{R}^{h \times h}$ are the parameters of the GRU, a is the sigmoid function, and "·" is the element-wise multiplication. The hidden state $h_i$ acts as a representation of the word $x_i$ in the context of the preceding sequence inputs $x_{<1}$. In order to incorporate information from the future words or tokens $x_{>1}$, the sequence X is processed in reverse with an additional GRU. Therefore, the first processing circuitry 205 maps each word or token $x_i$ to a contextual representation given by the concatenation of the forward and backward GRU hidden states $\tilde{x}_i = [\vec{h}_i, \overleftarrow{h}_i]$. Note this representation as $\tilde{q}_i \in \mathbb{R}^{2h}$ for word i in the question Q.

Returning to FIG. 5, the first processing circuitry 205 processes the question at a given time-step t to produce a query glimpse 520. In one embodiment, the query glimpse 520 ($q_t$) is formulated at the time-step t based on the following equations:

$$q_{i,t} = \text{softmax } \tilde{q}_i^T (A_q s_{t-1} + a_q), \quad \text{Equation 5}$$

$$q_t = \Sigma_i q_{i,t} \tilde{q}_i, \quad \text{Equation 6}$$

where T is a given number of time-steps, $q_{i,t}$ are the query attention weights and $A_q \in \mathbb{R}^{2h \times s}$, where s is the dimensionality of the inference GRU state, and $a_q \in \mathbb{R}^{2h}$. $A_q \in \mathbb{R}^{2h \times s}$ is the attention weight used to compute the bilinear attention. The attention uses a bilinear term to compute the importance of each query term in the current time-step t. Additionally, the term $a_q$ biases the attention mechanism towards words that tend to be relevant to answering the question across the questions independently of the search key $s_{t-1}$.

FIG. 6 is process flow diagram illustrating the second processing circuitry processing a document. In the illustrated embodiment, a document 600 includes one or more passages of text 605. At the given time-step t, the second processing circuitry 210 receives and processes the text 605 to produce a text glimpse 610. Like the question, the text 605 is a sequence of words $X=(x_1, \ldots, x_{|x|})$ drawn from a vocabulary V. In one embodiment, each word can be represented by a continuous word embedding $x \in \mathbb{R}^d$ that is stored in a word embedding matrix $X \in \mathbb{R}^{|V| \times d}$. In one aspect, the second processing circuitry 210 includes one or more neural networks (represented by neural network 615). One example of a neural network is the bi-directional recurrent neural network having GRUs. For each position i in the sequence X, the GRU receives as input the word embedding $x_i$ and updates a hidden state $h_{i-1}$ to $h_i = f(x_i, h_{i-1})$, where f is defined by Equations 1 through 4. The hidden state $h_i$ acts as a representation of the word $x_i$ in the context of the preceding sequence inputs $x_{<1}$. In order to incorporate information from the future words or tokens $x_{>1}$, the sequence X is processed in reverse with an additional GRU. Therefore, the second processing circuitry 210 maps each word or token $x_i$ to a contextual representation given by the concatenation of the forward and backward GRU hidden states $\tilde{x}_i = [\vec{h}_i, \overleftarrow{h}_i]$. Note this representation by $\tilde{d}_i \in \mathbb{R}^{2h}$ for word i in the text 605.

As described earlier, the second processing circuitry 210 processes the text 605 to produce a text glimpse 610. In one embodiment, the alternating attention continues by probing the text 605 given the current query glimpse $q_t$. The document attention weights are computed based on both the previous search state and the currently selected query glimpse $q_t$:

$$d_{i,t} = \text{soft max } \tilde{d}_i^T (A_d [s_{t-1}, q_t] + a_d), \quad \text{Equation 5}$$

$$d_t = \Sigma_i d_{i,t} \tilde{d}_i, \quad \text{Equation 6}$$

where $d_{i,t}$ are the attention weights for each word in the document and $A_d \in \mathbb{R}^{2h \times (s+2h)}$ and $a_d \in \mathbb{R}^{2h}$, $A_d \in \mathbb{R}^{2h \times (s+2h)}$ is the attention weight used to compute the bilinear attention. The document attention is also conditioned on $s_{t-1}$, which allows the NLCS to perform transitive reasoning on the document (e.g., to use previously obtained document information to bias future attended locations).

Figure 7:
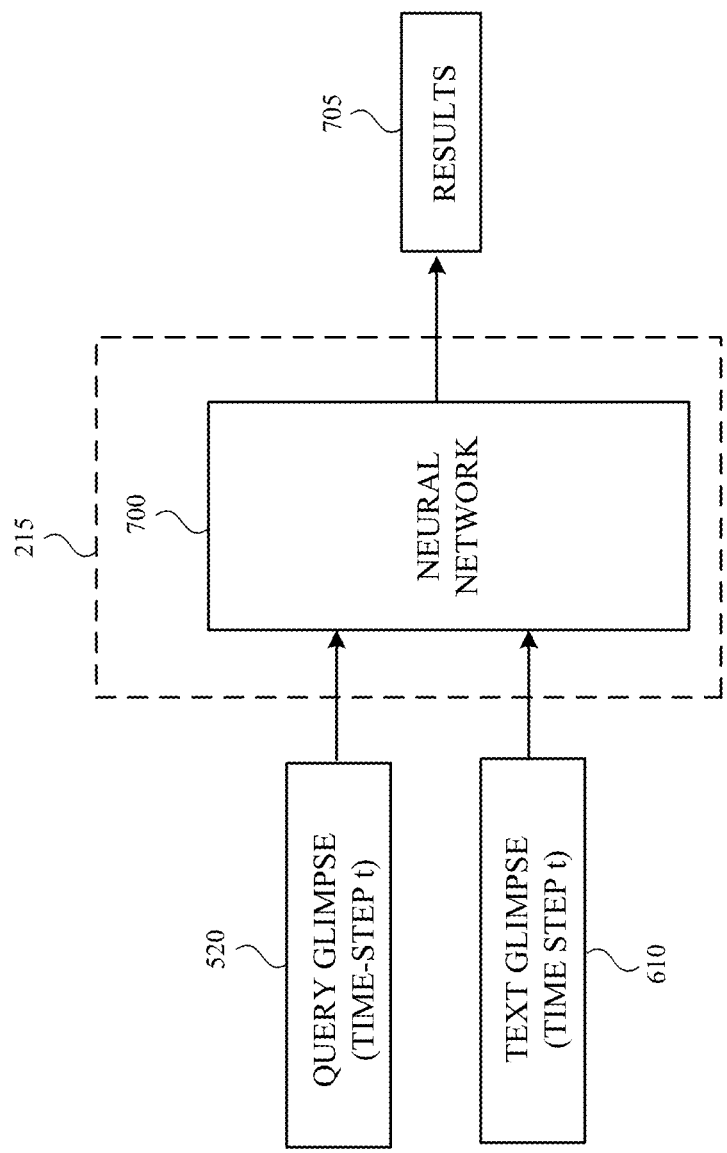
FIG. 7 is process flow diagram depicting the third processing circuitry processing a query glimpse and a text glimpse.

FIG. 7 is process flow diagram depicting the third processing circuitry processing a query glimpse and a text glimpse. In one embodiment, the third processing circuitry 215 includes one or more neural networks (represented by neural network 700), such as a bi-directional recurrent neural network having GRUs. The query glimpse 520 and the text glimpse 610 produced at the time-step t are processed by the bi-directional recurrent neural network to produce a result 705. As described earlier, the result 705 may be a set of candidate answers or information that is not useful or relevant to predicting an answer to the question.

In some embodiments, the GRU of the neural network 700 may evolve on the basis of the information gathered from the current step, e.g., $s_t=f([q_t, d_t], s_{t-1})$, where f is defined by Equations 1 through 4. This evolution permits the neural network 700 to update the recurrent state. However, in some instances, the current query glimpse may be too general or the text may not contain the information specified in the query glimpse (e.g., the query or the document attention weights can be nearly uniform). In such situations, a gating mechanism can be included in the neural network 700 that resets the current query and text glimpses when the result 705 is not useful. In some embodiments, the gating mechanism may be defined by the equation $r=g([s_{t-1}, q_t, d_t, q_t \cdot d_t])$, where "·" is the element-wise multiplication and g: $\mathbb{R}^{s+6h} \rightarrow \mathbb{R}^{2h}$. The gate g can take the form of a two-layer feed-forward network with sigmoid output unit activation. The fourth argument of the gate g considers multiplicative interactions between the query and text glimpses, which may make it easier to determine the degree of matching between the query and text glimpses. Given a query gate $g_q$, producing $r_q$, and a document gate $g_d$, producing $r_d$, the inputs of the GRU of the neural network 700 are given by the reset version of the query and the text glimpses, e.g., $s_t=f([r_q \cdot q_t, r_d \cdot d_t], s_{t-1})$. Thus, the neural network 700 reviews the query glimpse with respect to the contents of the text glimpse and vice versa.

In some embodiments, after the given number of time-steps T, the document attention weights obtained in the last search step $d_{i,T}$ are used to predict the probability of the answer given the text and the question P(a|Q, D). In determining the probability, the following pointer-sum loss defined by Equation 7 may be applied:

$$P(a|Q,D)=\Sigma_{i \in I(a,D)} d_{i,T}, \quad \text{Equation 7}$$

where I(a,D) is a set of positions where a occurs in the text. In some embodiments, the NLCS is trained to increase or maximize log P(a|Q, D) over the training corpus.

In one embodiment, the NLCS is trained using a stochastic gradient descent with the ADAM optimizer. The weights are initialized by sampling from the normal distribution N and the GRU recurrent weights are initialized to be orthogonal and biases are initialized to zero. One advantage to using Cloze-style questions to evaluate the NLCS is that a sufficient amount of training and test data can be obtained without human intervention. The Children's Book Test (CBT) and the Cable News Network (CNN) corpora are two such datasets. The CBT corpus was generated from well-known children's books. Documents consist of 20-sentence excerpts from these books. The related query is formed from an excerpt's 21st sentence by replacing a single word with an anonymous placeholder token.

The CNN corpus was generated from news articles available through the CNN website. The documents are given by the full articles themselves, which are accompanied by short, bullet-point summary statements. Instead of extracting a question from the articles themselves, a named entity within each article summary is replaced with an anonymous placeholder token. For both datasets, the training and evaluation data consist of tuples (Q; D; A; a), where Q is the question, D is the document, A is the set of possible answers, and a∈A is the correct answer. All words come from a vocabulary V, and, by construction A ⊂ D. For each question, a placeholder token is substituted for the real answer a.

Figure 8:
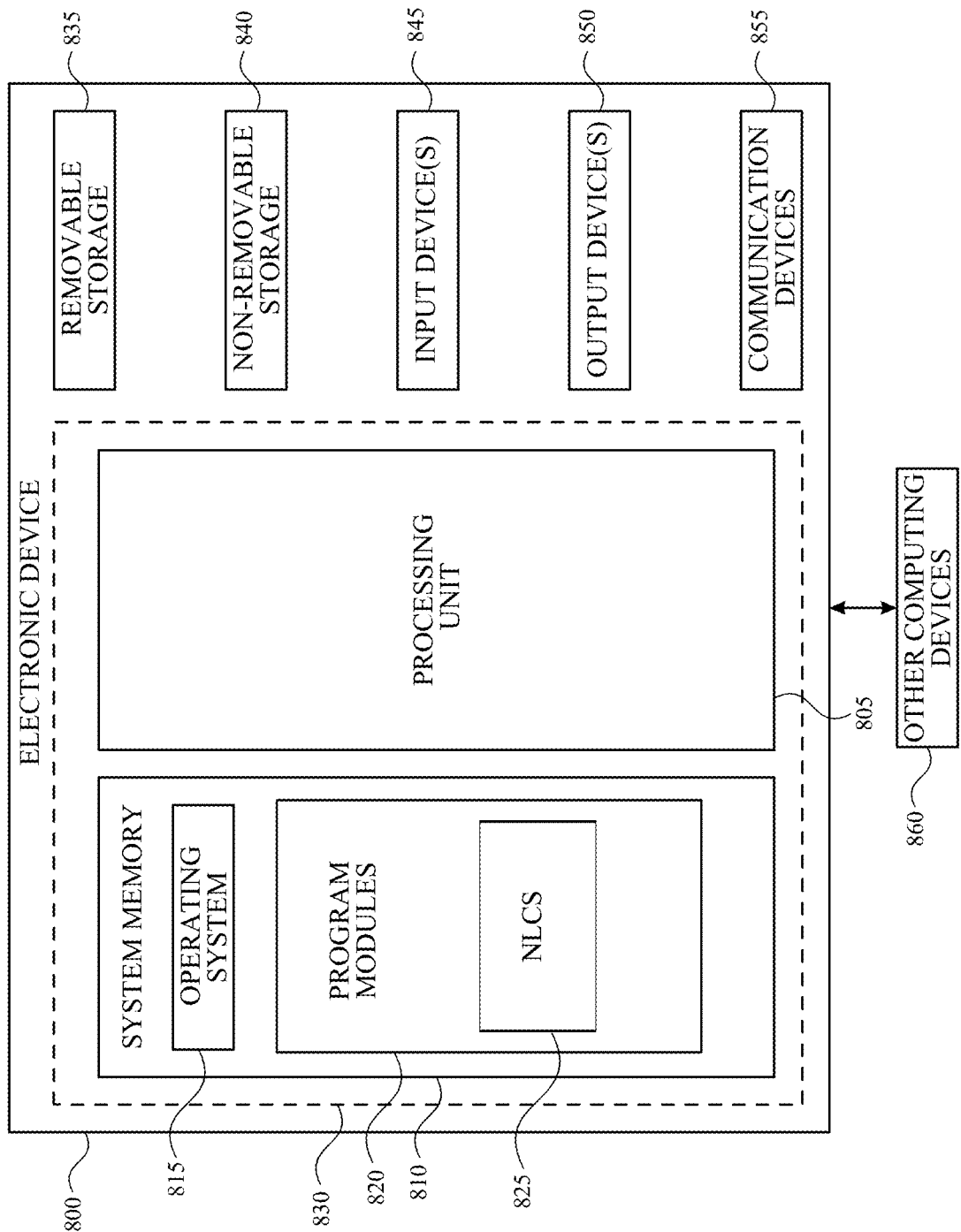
FIG. 8 is a block diagram illustrating example physical components of an electronic device with which aspects of the disclosure may be practiced.

FIG. 8 is a block diagram illustrating physical components (e.g., hardware) of an electronic device 800 with which aspects of the disclosure may be practiced. The components described below may be suitable for the computing devices described above, including the client-computing device 110 and/or the server-computing device 125 in FIG. 1.

In a basic configuration, the electronic device 800 may include at least one processing unit 805 and a system memory 810. Depending on the configuration and the type of the electronic device, the system memory 810 may comprise, but is not limited to, volatile storage (e.g., random access memory), non-volatile storage (e.g., read-only memory), flash memory, or any combination of such memories. The system memory 810 may include a number of program modules and data files, such as an operating system 815, one or more program modules 820 suitable for parsing received input, determining subject matter of received input, determining actions associated with the input and so on, and a NLCS program module 825. While executing on the processing unit 805, the NLCS program module 825 may perform and/or cause to be performed processes including, but not limited to, the aspects as described herein.

The operating system 815, for example, may be suitable for controlling the operation of the electronic device 800. Furthermore, embodiments of the disclosure may be practiced in conjunction with a graphics library, other operating systems, or any other application program and is not limited to any particular application or system. This basic configuration is illustrated in FIG. 8 by those components within a dashed line 830.

The electronic device 800 may have additional features or functionality. For example, the electronic device 800 may also include additional data storage devices (removable and/or non-removable) such as, for example, magnetic disks, optical disks, or tape. Such additional storage is illustrated in FIG. 8 by a removable storage device 835 and a non-removable storage device 840.

The electronic device 800 may also have one or more input device(s) 845 such as a keyboard, a trackpad, a mouse, a pen, a sound or voice input device, a touch, force and/or swipe input device, etc. The output device(s) 850 such as a display, speakers, a printer, etc. may also be included. The aforementioned input and output devices are examples and others may be used. The electronic device 800 may include one or more communication devices 855 allowing communications with other electronic devices 860. Examples of suitable communication devices 855 include, but are not limited to, radio frequency (RF) transmitter, receiver, and/or transceiver circuitry; universal serial bus (USB), parallel, and/or serial ports.

The term computer-readable media as used herein may include computer storage media. Computer storage media may include volatile and nonvolatile, removable and non-removable media implemented in any method or technology for storage of information, such as computer readable instructions, data structures, or program modules.

The system memory 810, the removable storage device 835, and the non-removable storage device 840 are all computer storage media examples (e.g., memory storage or storage device). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the electronic device 800. Any such computer storage media may be part of the electronic device 800. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit.

When operating via an SOC, the functionality, described herein, with respect to the capability of client to switch protocols may be operated via application-specific logic integrated with other components of the electronic device 800 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Figure 9:
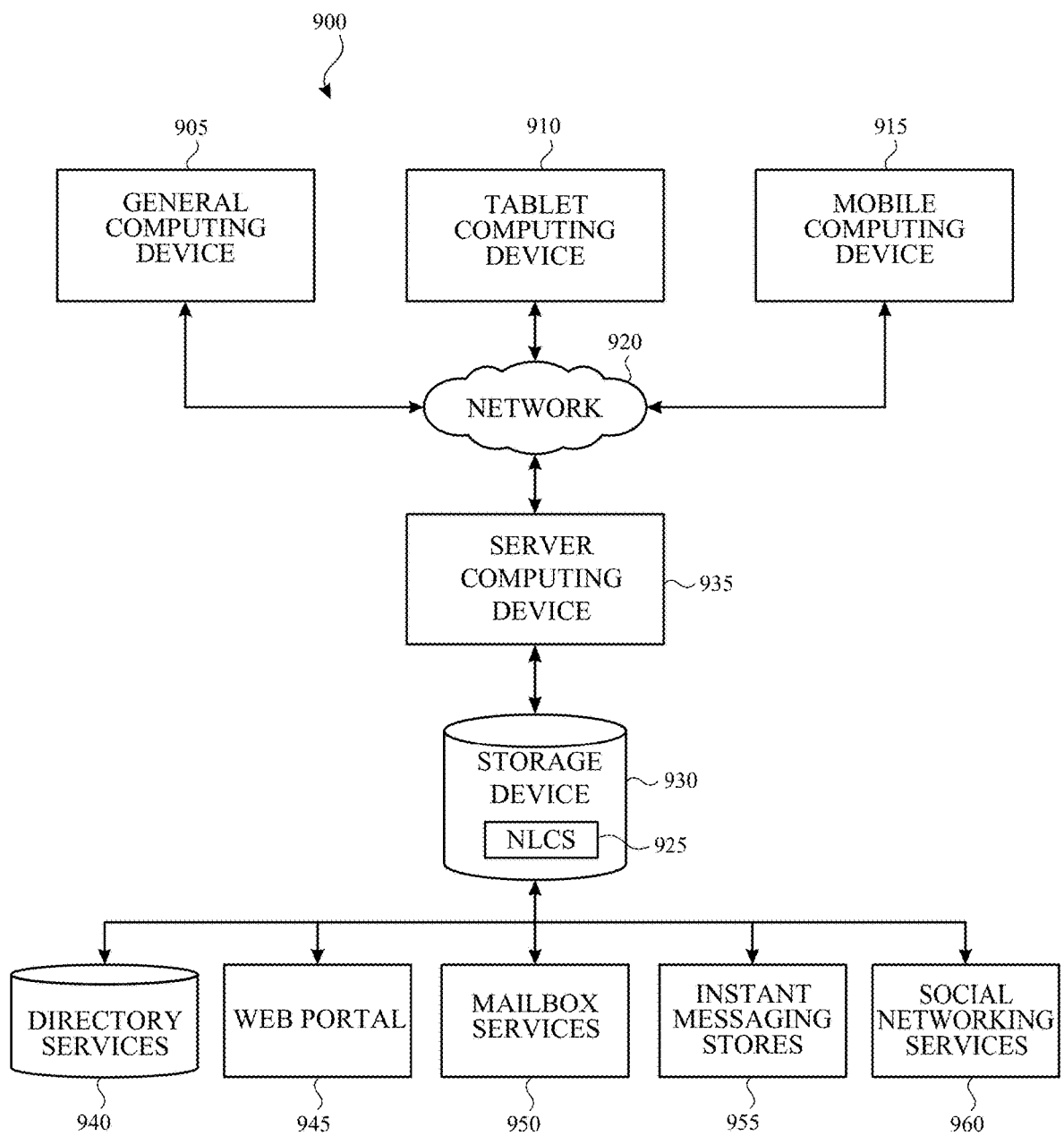
FIG. 9 is a block diagram of a distributed computing system in which aspects of the present disclosure may be practiced.

FIG. 9 is a block diagram illustrating a distributed system in which aspects of the disclosure may be practiced. The system 900 allows a user to submit a question relating to supporting text in a document through a general computing device 905 (e.g., a desktop computer), a tablet computing device 910, and/or a mobile computing device 915. The general computing device 905, the tablet computing device 910, and the mobile computing device 915 can each include the components, or be connected to the components, that are shown associated with the client-computing device 110 in FIG. 1.

The general computing device 905, the tablet computing device 910, and the mobile computing device 915 are each configured to access one or more networks (represented by network 920) to interact with the NLCS 925 stored in one or more storage devices (represented by storage device 930) and executed by one or more server-computing devices (represented by server-computing device 935).

In some aspects, the server-computing device 935 can access and/or receive various types of documents that include the supporting text. The documents can be stored in the storage device 930 or transmitted from other sources, such as a directory service 940, a web portal 945, mailbox services 950, instant messaging services 955, and/or social networking services 960. In some instances, these sources may provide robust reporting, analytics, data compilation and/or storage service, etc., whereas other services may provide search engines or other access to data and information, images, videos, document processing and the like.

As should be appreciated, FIG. 9 is described for purposes of illustrating the present methods and systems and is not intended to limit the disclosure to a particular sequence of steps or a particular combination of hardware or software components.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The invention claimed is:

1. A system, comprising:
   first processing circuitry;
   second processing circuitry;
   third processing circuitry operably connected to the first processing circuitry and the second processing circuitry; and
   one or more storage devices storing computer executable instructions that when executed by the first, the second, and the third processing circuitries, perform a method, the method comprising:
   processing, by the first processing circuitry, a question relating to a document to produce a query glimpse, the query glimpse comprising one or more entities from only a portion of the question;
   processing, by the second processing circuitry, one or more passages of text in the document to produce a text glimpse, the text glimpse comprising one or more entities that may be relevant to answering the question, wherein the one or more entities is from only a portion of the text; and
   processing, by the third processing circuitry, the query glimpse and the text glimpse to produce a result, the result comprising one of:
   a set of candidate answers, the set comprising one or more candidate answers; or information that is not relevant in predicting an answer to the question.

2. The system of claim 1, wherein the question comprises a Cloze-style question.

3. The system of claim 1, wherein the result further comprises a probability distribution over the set of candidate answers when the result comprises the set of candidate answers.

4. The system of claim 3, wherein the method further comprises determining a predicted answer from the set of candidate answers based on the probability distribution.

5. The system of claim 4, wherein the method further comprises causing the predicted answer to be transmitted over a network to a client-computing device.

6. The system of claim 1, wherein the first processing circuitry, the second processing circuitry, and the third processing circuitry each comprises one or more bi-directional recurrent neural networks having gated recurrent units.

7. The system of claim 1, further comprising a question formatter that converts a non-Cloze-style question into a Cloze-style question.

8. A method, comprising:
processing a question relating to a document to produce a query glimpse, the query glimpse comprising one or more entities from only a portion of the question;
processing one or more passages of text in the document to produce a text glimpse, the text glimpse comprising one or more entities that may be relevant to answering the question, wherein the one or more entities is from only a portion of the text; and
processing the query glimpse and the text glimpse to produce a result, the result comprising one of:
a candidate set of answers, the set comprising one or more candidate answers; or
information that is not relevant in predicting an answer to the question.

9. The method of claim 8, further comprising receiving the question, the question comprising a Cloze-style question.

10. The method of claim 8, further comprising converting the question into a Cloze-style question prior to processing the question.

11. The method of claim 8, wherein the result further comprises a probability distribution over the set of candidate answers when the result comprises the set of candidate answers.

12. The method of claim 11, further comprising determining a predicted answer from the candidate set of answers based on the probability distribution.

13. The method of claim 12, further comprising causing the predicted answer to be transmitted over a network to a client-computing device.

14. The method of claim 8, further comprising discarding the information when the result comprises the information that is not relevant in predicting an answer to the question.

15. A method, comprising:
processing, at a first time-step, a question relating to a document to produce a query glimpse, the query glimpse comprising one or more entities in a portion of the question;
processing, at the first time-step, one or more passages of text in the document to produce a text glimpse, the text glimpse comprising one or more entities in a portion of the text that may be relevant to answering the question;
processing the query glimpse and the text glimpse to produce a result;
determining if the result comprises a set of candidate answers;
when the result comprises the set of candidate answers, storing the set of candidate answers;
determining if all of the query and the text glimpses have been processed;
based on a determination that all of the query and the text glimpses have not been processed, repeating, at each subsequent time-step, until all of the query and the text glimpses have been processed, the operations of:
processing the question relating to the document to produce an additional query glimpse, the additional query glimpse comprising one or more different entities in a different portion of the question;
processing one or more additional passages of text in the document to produce an additional text glimpse, the additional text glimpse comprising one or more different entities in a different portion of the text that are relevant to answering the question;
processing the additional query glimpse and the additional text glimpse to produce an additional result;
determining if the additional result comprises another set of candidate answers; and
when the result comprises the additional set of candidate answers, storing the additional set of candidate answers; and
based on a determination that all of the query and the text glimpses have been processed, determining a predicted answer based on each stored set of candidate answers.

16. The method of claim 15, further comprising at least one of:
discarding the result when the determination is the result does not comprise the set of candidate answers; or
discarding a respective additional result when the determination is the additional result does not comprise the additional set of candidate answers.

17. The method of claim 15, further comprising receiving the question, wherein the question comprises a Cloze-style question.

18. The method of claim 15, wherein:
the result further comprises a probability distribution over the set of candidate answers when the result comprises the set of candidate answers; and
each additional result further comprises an additional probability distribution over the additional set of candidate answers when the additional result comprises the additional set of candidate answers.

19. The method of claim 18, wherein the operation of determining the predicted answer based on each stored set of candidate answers comprises determining the predicted answer based on the probability distribution associated with the stored set of candidate answers and, if one or more additional sets of candidate answers have been stored, on the additional probability distribution associated with each stored additional set of candidate answers.

20. The method of claim 18, further comprising transmitting, across a network, the predicted answer to a client-computing device.

* * * * *